United States Patent
AbuSamra et al.

(10) Patent No.: US 7,367,440 B2
(45) Date of Patent: May 6, 2008

(54) VARIABLE ENGAGEMENT CENTRIFUGAL CLUTCH ASSEMBLY

(75) Inventors: Muneer AbuSamra, Southern Pines, NC (US); Robert Anthony Sayman, Laurinburg, NC (US); Charles E. Allen, Jr., Rochester Hills, MI (US); Winfried Sturmer, Euerbach (DE); Karl-Fritz Heinzelmann, Meckenbeuren (DE); Ludger Ronge, Eriskirch (DE); Loren Christopher Dreier, Vass, NC (US); James Henry DeVore, Laurinburg, NC (US); Ronald Peter Muetzel, Friedrichshafen (DE)

(73) Assignee: Meritor Transmission Corporation, Troy, MI (US)

( * ) Notice: Subject to any disclaimer, the term of this patent is extended or adjusted under 35 U.S.C. 154(b) by 35 days.

(21) Appl. No.: 11/049,829

(22) Filed: Feb. 3, 2005

(65) Prior Publication Data

US 2006/0169570 A1    Aug. 3, 2006

(51) Int. Cl.
*F16D 43/08*    (2006.01)
(52) U.S. Cl. ............................. 192/105 CP; 192/110 R
(58) Field of Classification Search ................ None
See application file for complete search history.

(56) References Cited

U.S. PATENT DOCUMENTS

| 1,995,406 | A | | 3/1935 | Tower |
|---|---|---|---|---|
| 2,071,588 | A | | 2/1937 | Swennes et al. |
| 2,183,761 | A | * | 12/1939 | Aspinwall et al. ......... 74/336.5 |
| 2,979,171 | A | | 4/1961 | Bland et al. |
| 3,580,372 | A | | 5/1971 | Schiefer et al. |
| 4,081,065 | A | | 3/1978 | Smyth et al. |
| 4,111,291 | A | | 9/1978 | Horstman |
| 5,070,984 | A | * | 12/1991 | Fehring ................... 192/105 B |
| 5,681,242 | A | | 10/1997 | Bates |
| 6,358,186 | B1 | | 3/2002 | Kosik et al. |
| 6,502,476 | B2 | | 1/2003 | Genise |
| 2002/0072447 | A1 | | 6/2002 | Genise |
| 2002/0134642 | A1 | | 9/2002 | Genise |
| 2002/0137595 | A1 | | 9/2002 | Markyvech et al. |
| 2002/0137596 | A1 | | 9/2002 | Markyvech |
| 2002/0137597 | A1 | | 9/2002 | Genise et al. |
| 2003/0042108 | A1 | | 3/2003 | Gochenour et al. |
| 2003/0045987 | A1 | | 3/2003 | Gochenour |

FOREIGN PATENT DOCUMENTS

| DE | 831 507 | 2/1952 |
|---|---|---|
| DE | 896 304 | 1/1954 |
| DE | 906 176 | 3/1954 |
| DE | 11 04 356 | 4/1961 |
| DE | 27 43 400 | 3/1979 |
| DE | 32 26 231 | 1/1984 |
| DE | 30 45 840 | 6/1986 |
| EP | 0 668 453 | 8/1995 |
| WO | WO 01/74618 | 10/2001 |
| WO | WO 02/48530 | 6/2002 |

* cited by examiner

*Primary Examiner*—Rodney H Bonck
(74) *Attorney, Agent, or Firm*—Carlson, Gaskey & Olds

(57) ABSTRACT

A centrifugal clutch assembly includes a clutch cover attachable to a rotatable input member. Friction plates are clamped between pressure plates in response to rotation of the clutch assembly. Rotation of the clutch assembly causes at least one centrifugal weight to move radially outward to force the pressure plates against the friction plates. The radial position of the centrifugal weights is modified to tailor clutch actuation. This modification of centrifugal weight position causes a corresponding change to engagement characteristics of the clutch assembly allowing clutch actuation to be tailored to operating conditions.

2 Claims, 7 Drawing Sheets

US 7,367,440 B2

VARIABLE ENGAGEMENT CENTRIFUGAL CLUTCH ASSEMBLY

BACKGROUND OF THE INVENTION

This invention relates generally to a centrifugal clutch assembly, and specifically to a centrifugal clutch assembly including features for modifying a rotational speed at which the clutch assembly engages.

Typically, a centrifugal clutch assembly includes a rotating input member such as a flywheel and one or more friction disks. The friction disks are forced against pressure plates that rotate with the flywheel. Centrifugal weights are pivotally mounted to rotate radially outward against a biasing spring in response to rotation of the centrifugal clutch assembly. As the rotational speed of the centrifugal clutch assembly increases, rollers on the centrifugal weights cause clamping engagement between the pressure plates and the friction disks to transmit torque to an output shaft.

Disadvantageously, a centrifugal clutch assembly begins actuation only within a substantially fixed and limited range of engine speed. In some circumstances, it may be desirable to begin actuation of the centrifugal clutch assembly outside this limited range, such as when heavy loads are carried up an incline or when a lightly loaded vehicle is moving down an incline. It is known to vary the biasing force exerted by the biasing spring to change the point at which the clutch assembly begins actuation. Other known devices adjust a backplate position to change compressive forces exerted by the centrifugal weights relative to engine speed. However, such devices require complex and costly controls and may not adapt easily to existing driveline assemblies.

Accordingly, it is desirable to develop a centrifugal clutch assembly including simple, reliable and adaptable features for modifying the rotational speed at which the centrifugal clutch assembly engages.

SUMMARY OF THE INVENTION

The present invention is a centrifugal clutch assembly that includes a plurality of weights each movable amongst various radial positions to control a rotational speed at which the clutch assembly engages.

In one example, the centrifugal clutch assembly includes a plurality of centrifugal weight assemblies each including a weight movable along a threaded member rotated by a drive. The position of the weight relative to a pivot point controls the rotational speed at which the centrifugal weight assemblies move outward to engage the clutch. The weight moves along the threaded member to change the position of the weight relative to the pivot point. Differing positions of the weight relative to the pivot point cause a change in the rotational speed at which the clutch assembly initiates engagement.

Another clutch assembly according to this invention includes a weight supported along a threaded rod and rotated about a pivot point. The pivot point moves within a slot to change a point about which the weight rotates. Changing the point about which the weight rotates tailors the rotational speed at which the clutch assembly initiates engagement.

Another clutch assembly according to this invention includes a blocking ring with a plurality of openings through which the weights pass. The blocking ring rotates to selectively restrict movement of a number of centrifugal weights. Controlling the number of weights that pass through the openings in the blocking ring tailors the amount of force available to cause engagement of the clutch assembly at a given rotational speed. The blocking ring controls the magnitude of centrifugal force available at a given rotational speed required to initiate engagement of the clutch assembly.

Another clutch assembly according to this invention includes a variable rate return spring assembly with a different biasing rate relative to the displacement of the centrifugal weight. The changes in biasing rate provided by the variable rate return spring assembly provide for the modification of the rotational speed required to cause engagement of the clutch assembly.

Another centrifugal clutch assembly according to this invention includes centrifugal weights that have a chamber filled with a viscous medium. Vibration or oscillatory movement of the centrifugal weights is dampened by the viscous medium. Dampening of vibrations and other possible oscillatory movements provides for smoother transition of the clutch assembly between disengaged and engaged positions.

Accordingly, the centrifugal clutch assembly of this invention provides simple, reliable, and adaptable features for tailoring operation and for modifying the rotational speed at which the clutch assembly engages.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
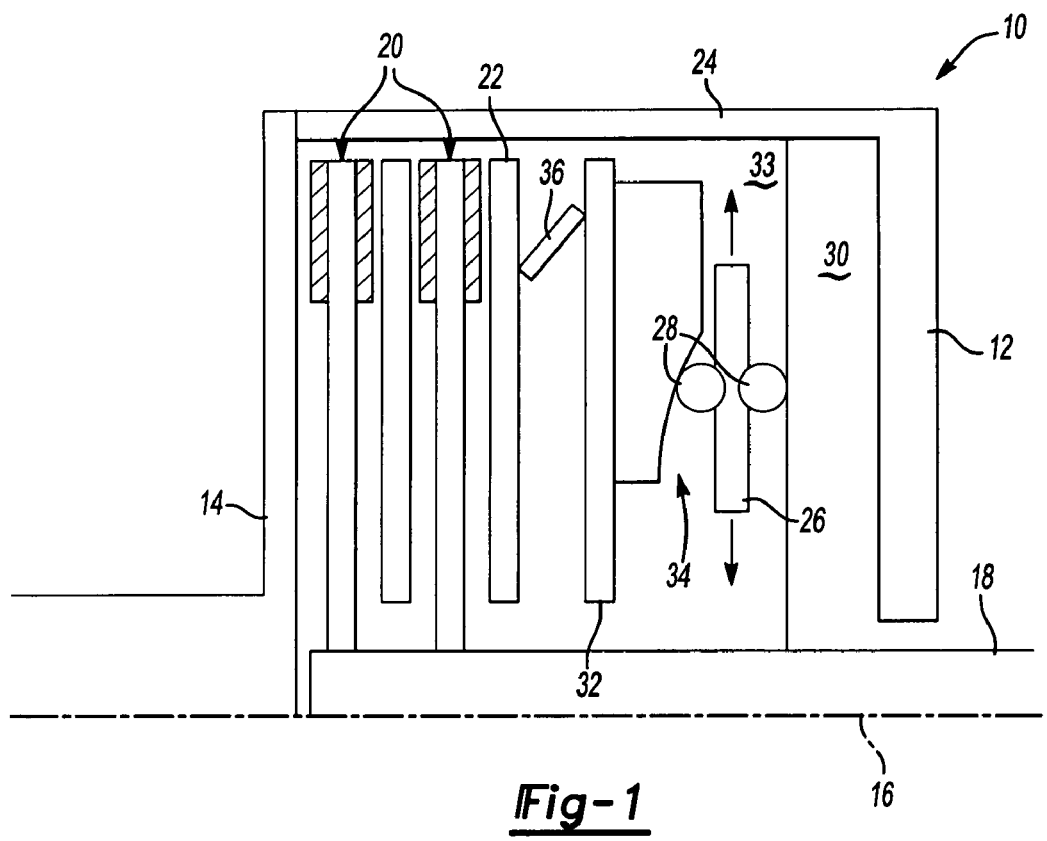
FIG. 1 is a schematic sectional view of a centrifugal clutch assembly according to this invention.

Referring to FIG. 1, a centrifugal clutch assembly 10 is schematically shown and includes a clutch cover 12 attached to a flywheel 14. The flywheel 14 and clutch assembly 10 rotate about an axis 16 to transmit torque to an output shaft 18. The clutch assembly 10 includes friction disks 20 that are rotatable to drive the output shaft 18. First and second pressure plates 22, 24 move axially to clamp the friction disks 20. A centrifugal weight assembly 26 includes rollers 28 that move within a space 33 defined between a front plate 32 and a facing wear compensating mechanism 30, which is supported by the clutch cover 12. The rollers 28 move upward along a ramped surface 34 of the front plate 32. Upward movement of the rollers 28 along the ramped surface 34 drives the front plate 32 along the axis 16 to compress a clamp spring 36.

Rotation of the clutch assembly 10 creates a centrifugal force that drives the centrifugal weight assembly 26 radially outward along the ramped surface 34. Radial movement of the centrifugal weight assembly 26 moves the front plate 32 axially, causing compression of the clamp spring 36. Compression of the clamp spring 36 forces the pressure plates 22, 24 into clamping engagement with the friction disks 20. Movement of the front plate 32 between clamped and open positions is dependent on the centrifugal force developed by rotation of the clutch assembly 10.

Figure 2:
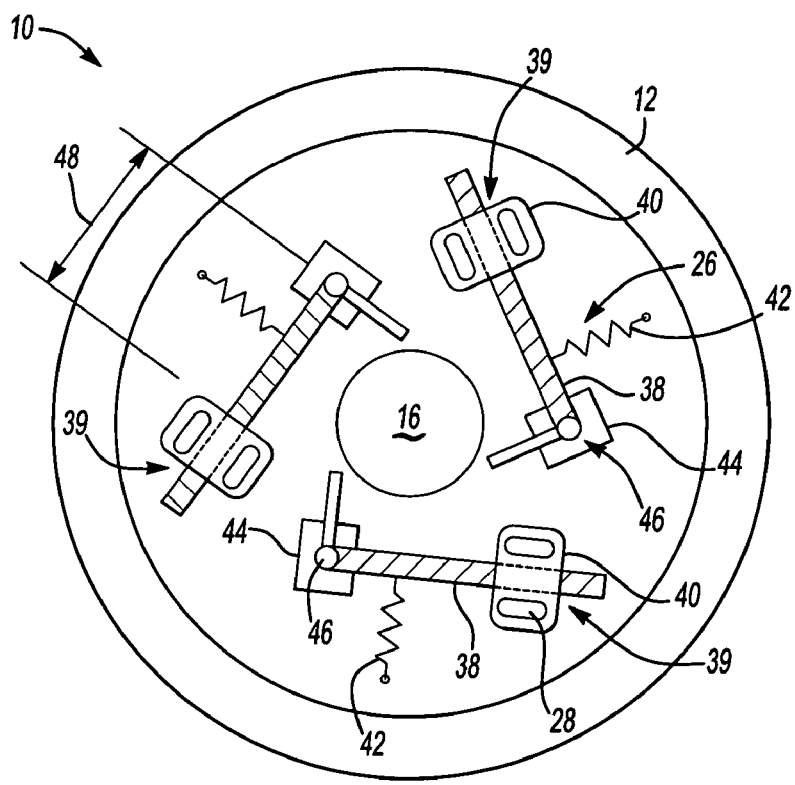
FIG. 2 is a schematic plan view of the centrifugal clutch assembly with a variable position centrifugal weight.

Referring to FIG. 2, the clutch assembly 10 includes a plurality of centrifugal weight assemblies 26. Each of the centrifugal weight assemblies 26 includes a threaded rod 38 that is rotated by a drive 44. The drive 44 is preferably an electric motor, however, other known devices, such as a solenoid and a hydraulic cylinder, for example, are also within the contemplation of this invention. The drive 44 is controlled by a controller (not shown) that adjusts actuation of the clutch assembly 10 according to application specific parameters. On each threaded rod 38 is a weight 40. The weight 40 includes threaded openings 39 that correspond to the threaded rod 38. The drive 44 rotates the threaded rod 38 to move the weight 40.

The rotational speed of the clutch assembly 10 generates a centrifugal force that causes the centrifugal weight assemblies 26 to move outward. The magnitude of centrifugal force generated is dependent on the position of the weight 40 relative to a pivot 46. Rotation of the threaded rod 38 moves the weight 40 to change a distance 48 between the pivot 46 and weight 40. Changing the distance 48 modifies the centrifugal force created for a given rotational speed. The greater the distance 48 between the weight 40 and pivot 46, the greater the radial force of the rollers 28 at a given rotational speed. Reducing the distance 48 between the weight 40 and the pivot 46 reduces the magnitude of radial force of the rollers 28 at a given speed. Greater radial forces generated by the rollers 28 results in earlier clutch engagement.

Figure 3:
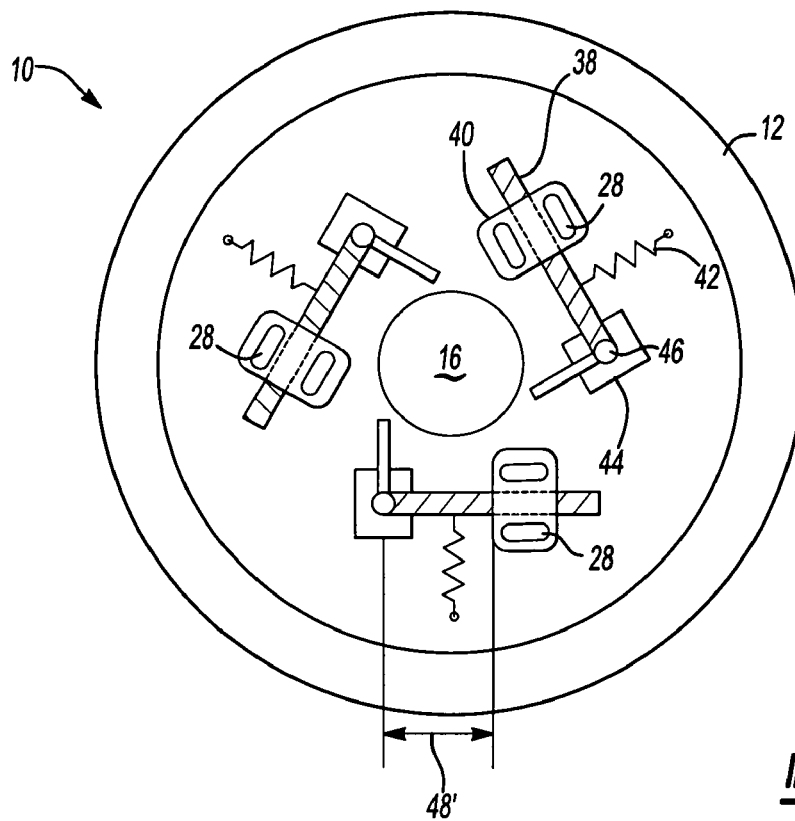
FIG. 3 is a schematic plan view of the centrifugal clutch assembly of FIG. 2 with the centrifugal weight moved toward a pivot.

Referring to FIG. 3, a distance 48' between the pivot 46 and the weight 40 is shown reduced from the distance 48 shown in FIG. 2. The reduced distance 48' between the weight 40 and the pivot 46 decreases the magnitude of radial force of the rollers 28 at a given rotational speed. Changing of the distance between the weight 40 and the pivot 46 changes the length of a moment arm that in turn results in the change of the radial force of the rollers 28 created by the centrifugal force acting on the weight 40. The result is that greater rotational speed is required to generate the required amount of radial force by the rollers 28 to initiate engagement of the clutch assembly 10. Thus, changing the distance of the weight 40 relative to the pivot 46 allows the rotational speed to be tailored for engaging the clutch assembly 10.

Figure 4:
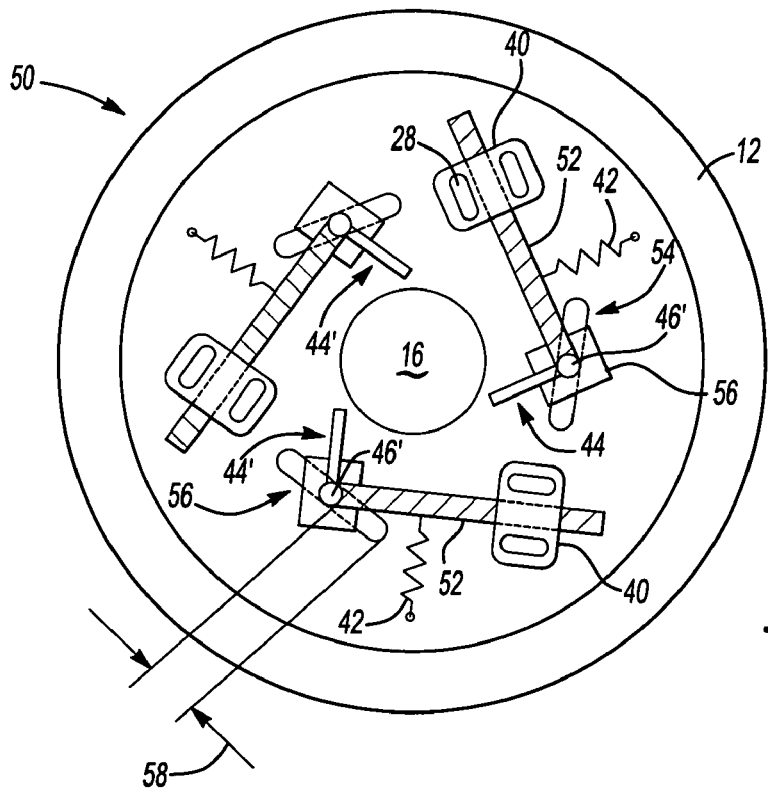
FIG. 4 is a schematic plan view of another centrifugal clutch assembly according to this invention including a movable pivot point.

Referring to FIG. 4, another clutch assembly 50 according to this invention includes the weight 40 disposed on a rod 52. The length between the weight 40 and a pivot 46' is fixed. The weight 40 and rod 52 rotate about the pivot 46'. The pivot 46' is movable within a slot 54. Movement of the pivot 46' within the slot 54 changes the position of the pivot 46' relative to the axis 16. A drive 44' is provided to move the pivot 46' within the slot 54. A distance 58 between an edge of the slot 54 and the pivot 46' is varied to change the rotational speed required to move the centrifugal weight assembly 26' and initiate clutch assembly 50 engagement.

Movement of the pivot 46' changes a preload of a biasing member 42 and by correspondingly changes force equilibrium at the rod 52. Movement of the pivot 46' toward the outside of the clutch assembly 50 will increase the preload of the biasing members 42 and will decrease the radial force of the rollers 28, whereas movement toward the axis 16 will decrease the preload of the biasing members 42 and will increase the amount of radial force of the rollers 28 generated by the centrifugal force of the weights 40 at a given speed.

Movement of the pivot 46' within the slot 54 provides for the modification of the radial force of the rollers 28. Modification of the radial force of the rollers 28 changes the initial engagement point of the clutch assembly 50.

Figure 5:
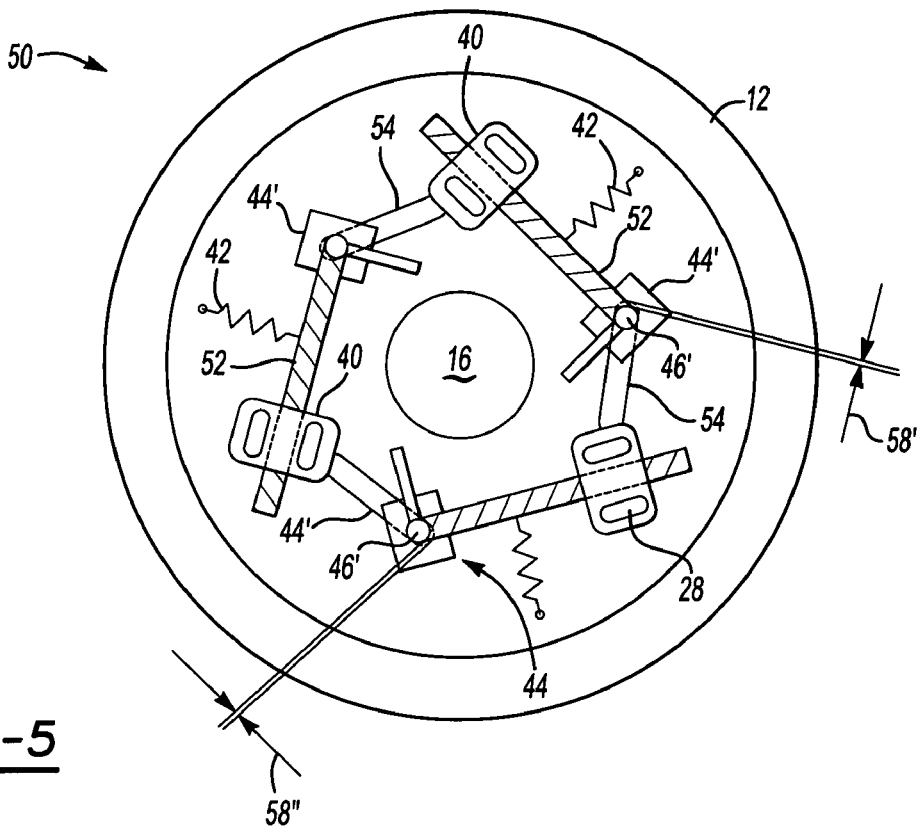
FIG. 5 is a schematic plan view of the centrifugal clutch assembly with the pivot point moved from the position shown in FIG. 4.

Referring to FIG. 5, a distance 58' is shown reduced with pivot 46' moved outward relative to the axis 16. The outward or inward movement of the pivot 46' changes the preload of the biasing members 42 and therefore also changes the amount of radial force at the rollers 28 that is generated by the centrifugal force of the weight 40 on the rod 52. This change in radial force of the rollers 28 results in a modification to the rotational speed at which the clutch assembly 50 will begin engagement. The pivot 46' is moved to the radially outermost portion of the slot 54. In the radially outermost position, the generation of radial force of the rollers 28 is minimized. Minimizing the generation of centrifugal force results in an increase in the rotational speed required to cause engagement of the clutch assembly 50.

Movement of the pivot 46' within the slot 54 inward toward the axis 16 increases the amount of generated radial force of the rollers 28. The resulting decrease in generated centrifugal force required decreases the rotational speed at which sufficient centrifugal force is generated to initiate clutch assembly 50 engagement.

Figure 6:
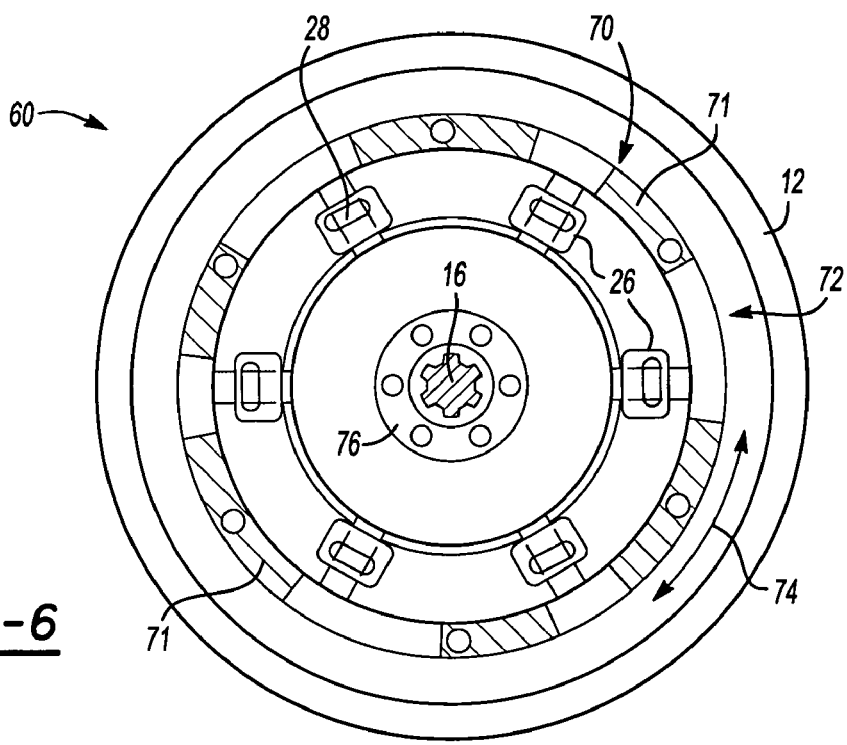
FIG. 6 is a schematic plan view of another centrifugal clutch assembly according to this invention that includes a movable blocking ring.

Referring to FIG. 6, another clutch assembly 60 according to this invention includes a blocking ring 70. The blocking ring 70 is disposed about the circumference of the clutch cover 12 and defines several openings 72. The blocking ring 70 is rotatable back and fourth about the axis 16 independent of rotation of the clutch cover 12 in a direction schematically indicated by arrow 74. The openings 72 are interspaced within the walls 71 of the blocking ring 70. Rotation of the clutch cover 12 causes the centrifugal weight assemblies 26 to move radially outward from their initial position. In the position of the blocking ring 70 shown in FIG. 6, all of the centrifugal weight assemblies 26 are able to move freely to their maximum outward radial position because each centrifugal weight assembly 26 is aligned with one of the openings 72.

A drive 76 rotates the blocking ring 70 independent of the clutch cover 12. The drive 76 is a stepper motor capable of precisely positioning the blocking ring 70. Although, a stepper motor is illustrated, the drive 76 can be any electrical or mechanical device.

Figure 7:
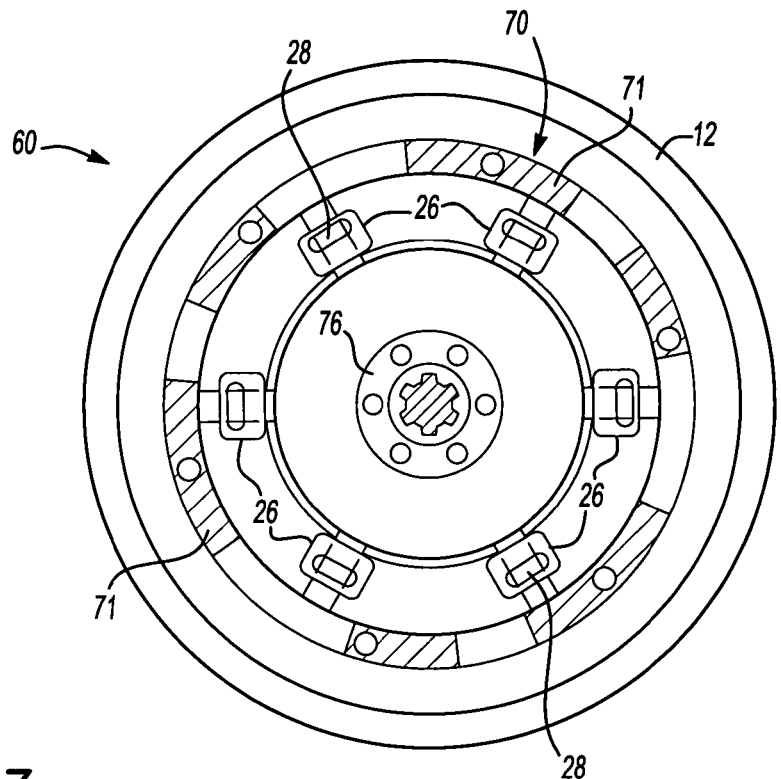
FIG. 7 is a schematic plan view of the centrifugal clutch assembly of FIG. 6.

Referring to FIG. 7, the clutch assembly 60 is shown with the blocking ring 70 moved to a position to block at least some of the centrifugal weight assemblies 26. The centrifugal weight assemblies 26 are blocked by walls 71 formed in the blocking ring 70. When some of the centrifugal weights 26 are blocked, clutch engagement is modified. Preventing free movement of some of the centrifugal weight assemblies 26 with the blocking ring 70 will result in an overall reduction in force acting on the clamp spring 36 (shown in FIG. 1). The overall reduction in force against the clamp spring 36 modifies the engagement characteristics of the clutch assembly 60 by requiring additional rotational speed to generate like magnitudes of centrifugal force.

In the position shown in FIG. 7, three of the six centrifugal weights 26 are blocked from moving freely to the outermost radial position. Accordingly, the rotational speed of the clutch assembly 60 required to generate the same amount of force as would have been supplied if all six of the centrifugal weight assemblies 26 were able to move freely is increased.

The blocking ring 70 may include different numbers of openings 72 such that differing numbers of centrifugal weight assemblies 26 are blocked in order to tailor actuation of the clutch assembly 60. Although one centrifugal weight blocking ring 70 is shown, it is within the contemplation of this invention to use multiple blocking rings 70 in series to further tailor clutch engagement characteristics. A worker skilled in the art with the benefit of this disclosure would understand the multiple configurations applicable to specific applications to tailor clutch engagement characteristics.

Figure 8:
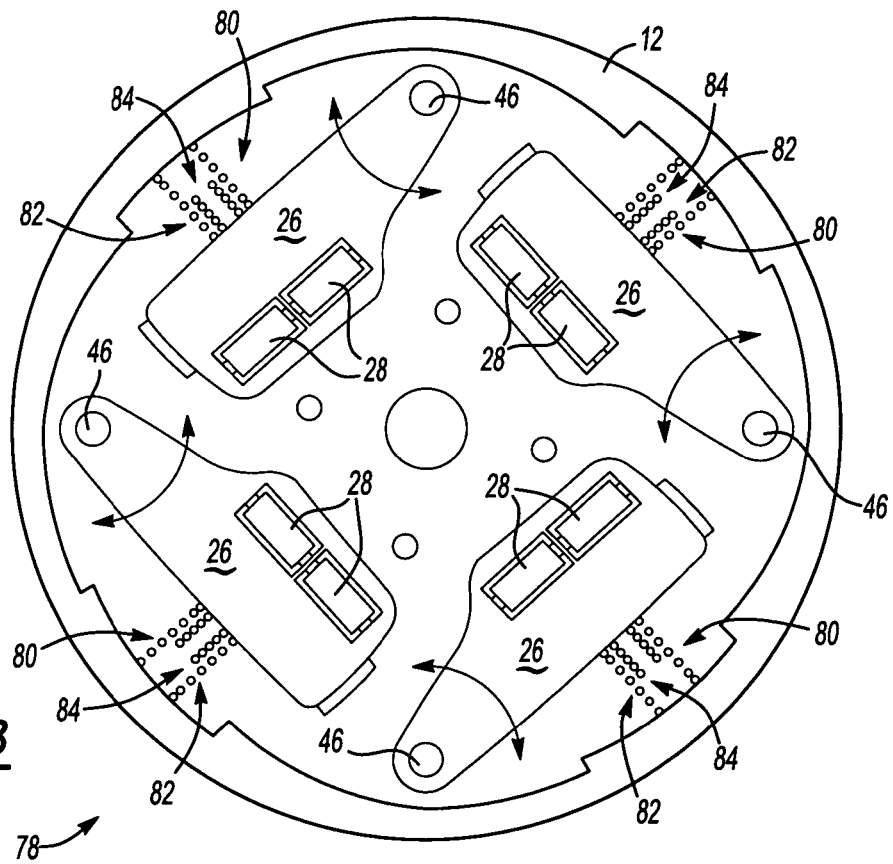
FIG. 8 is a schematic plan view of another centrifugal clutch assembly according to this invention including a variable rate biasing spring assembly.

Referring to FIG. 8, another clutch assembly 78 according to this invention includes a return spring assembly 80 having first and second springs 82, 84. The second spring 84 engages after initial movement of the centrifugal weight assembly 26 causing a change in the rate of biasing force exerted on the centrifugal weight assembly 26.

Figure 9:
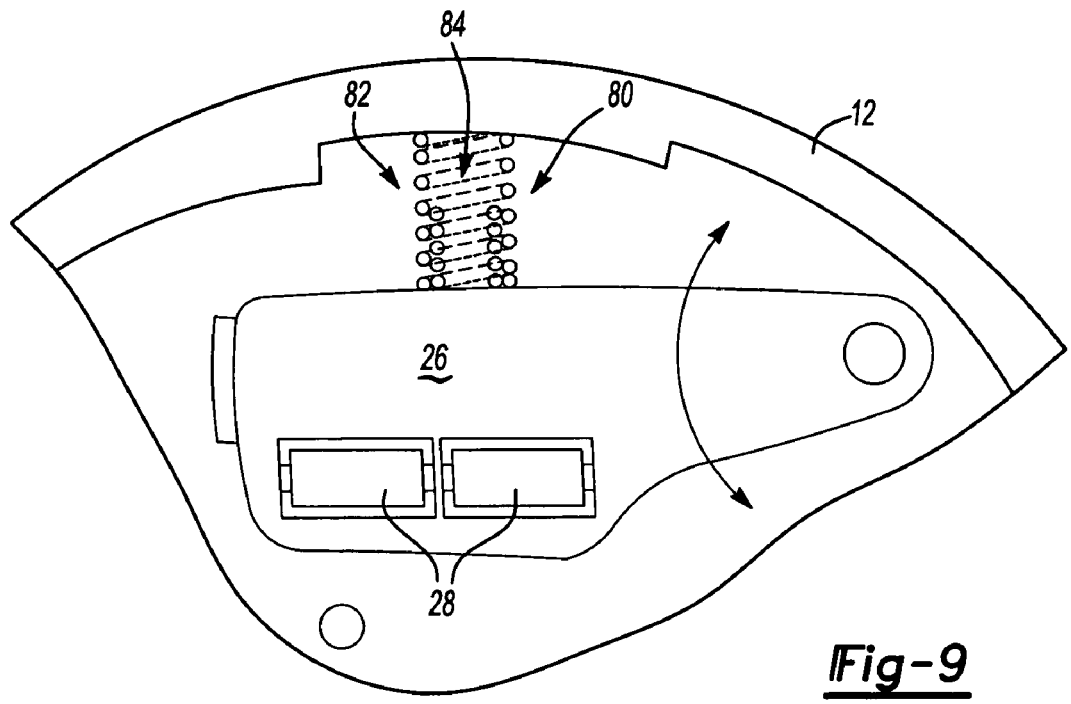
FIG. 9 is an enlarged schematic view of the variable rate biasing spring assembly shown in FIG. 8.

Referring to FIG. 9, an enlarged view of the return spring assembly 80 is shown with the first spring 82 always engaged with the centrifugal weight assembly 26. The second spring 84 is not engaged during initial movement and therefore does not initially contribute to the biasing force of the spring assembly 80. Further outward radial movement of the centrifugal weight assembly 26 causes engagement of the second spring 84. Engagement of the second spring 84 changes the spring rate that in turn modifies the amount of centrifugal force required to drive the centrifugal weight 26 outward. Modification by use of a variable biasing member allows for specific tailoring of clutch engagement characteristics to a given rotational speed.

The balance between generated centrifugal force and the return spring assembly 80 determines the rotational speed at which the clutch will engage. A spring with a fixed biasing rate provides a linear relationship between force and displacement of the centrifugal weight assembly 26. In some instances, the linear relationship does not provide a desired balance to cause clutch actuation at a desired rotational speed. Changing the biasing rate relative to centrifugal weight assembly displacement provides for the balance required to cause clutch actuation at a desired rotational speed.

Figure 10:
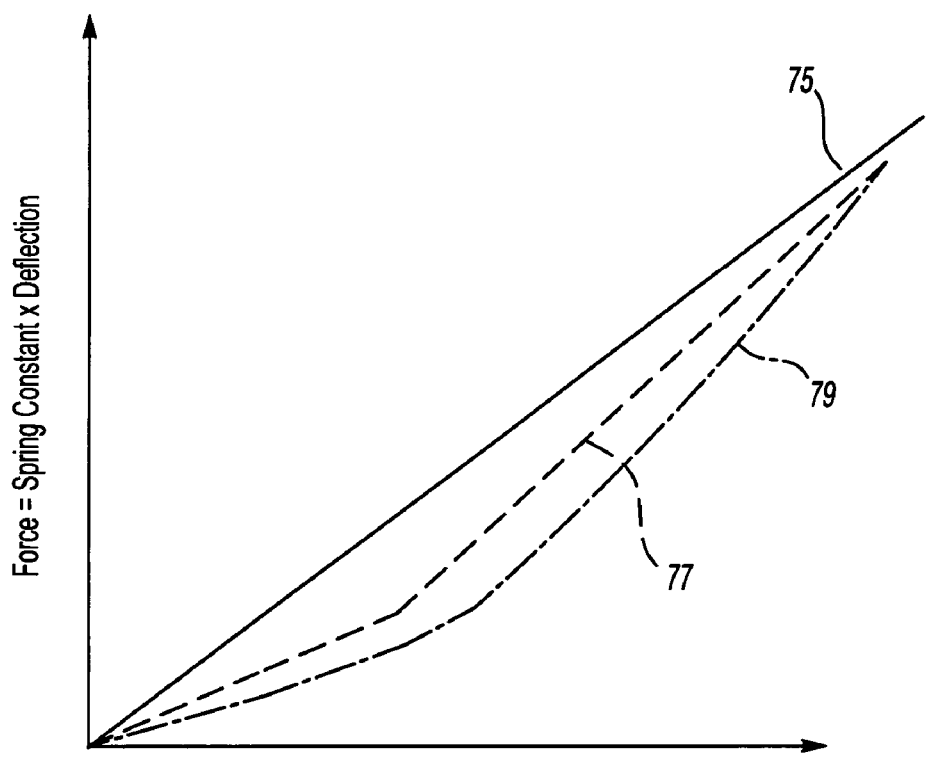
FIG. 10 is a graph illustrating a relationship between deflection of the biasing member and biasing force.

Referring to FIG. 10, a graph is shown that illustrates the varying biasing force versus deflection that correspond to radial movement of the centrifugal weight assemblies 26. Typically, the deflection versus biasing load is a constant generally straight-line 74 from beginning of engagement until the outermost radial position of the centrifugal weight 26. However, as is indicated by lines 77 and 79 the return spring assembly 80 provides a different force at different deflections.

Figure 11:
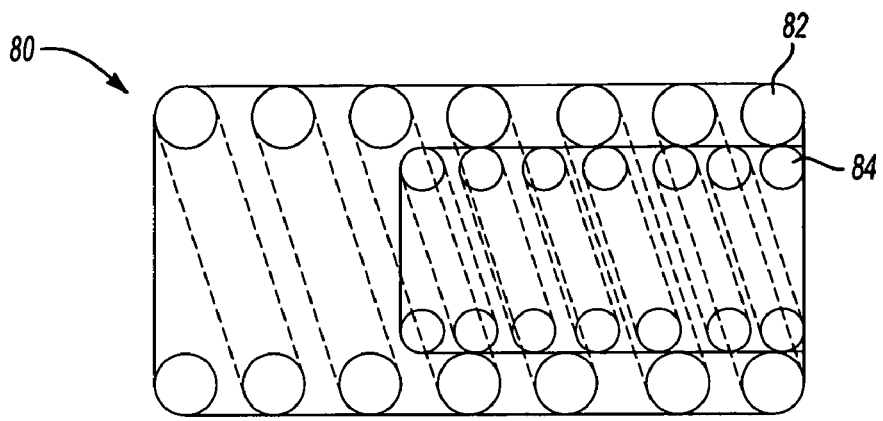
FIG. 11 is a variable biasing member according to this invention.

Referring to FIG. 11, the first spring 82 provides an initial return force to the centrifugal weight assembly 26, during initial movement of the centrifugal weight assembly 26. The second spring 84 engages after the initial displacement to increase the biasing force on the centrifugal weight assembly 26, resulting in an increase in the rotational speed required to generate the centrifugal force to overcome the return spring assembly 80 and begin clutch actuation.

Figure 12:
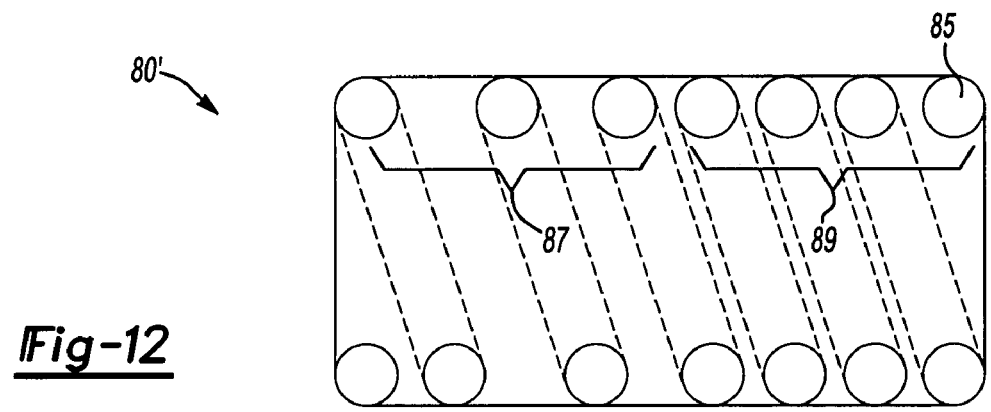
FIG. 12 is another variable biasing member according to this invention.

Referring to FIG. 12 another return spring assembly 80' illustrates a gradually rising spring characteristic within a single spring that has a variable biasing rate. The return spring assembly 80' includes a spring 85 that has first engagement coils 87 that are spaced a distance apart to provide a first biasing rate. The spring 85 also includes second engagement coils 89 that are spaced apart a smaller distance than the first engagement coils 87 to provide a greater biasing force. The variable biasing rate can also be achieved by having a different spring diameter along the spring length. During operation, the centrifugal weight assembly 26 moves and is biased by the first engagement coils 87. Further movement causes engagement with the second engagement coils 89. Compression of the first and second engagement coils 87,89 provides different biasing forces and therefore provides tailored biasing forces relative to radial displacement of the centrifugal weights assemblies 26.

Figure 13:
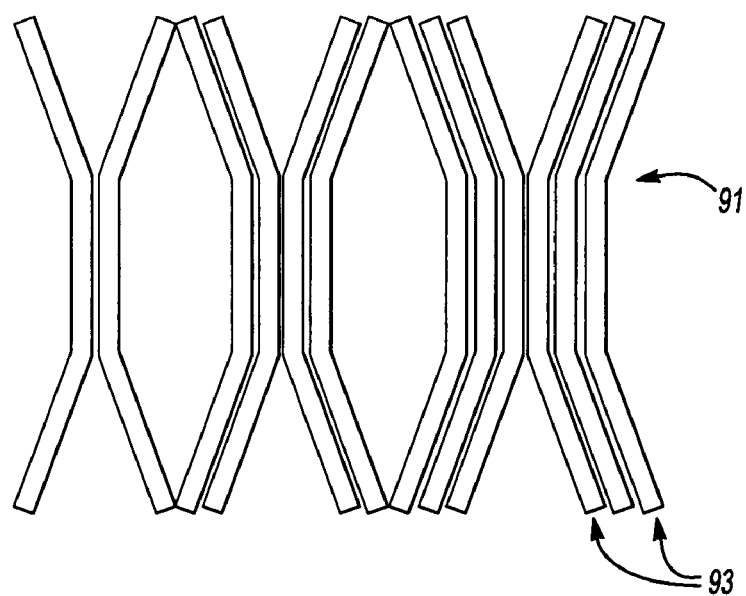
FIG. 13 is another variable biasing member according to this invention.

Referring to FIG. 13 another biasing assembly 91 includes several Belleville springs 93. The Belleville springs 93 can be stacked in such a way and in such combinations, as to tailor the biasing force to desired parameters to vary the biasing forces exerted on the centrifugal weight assemblies 26. As appreciated, these are only examples of some variable biasing devices that provide variable biasing forces relative to displacement. A worker skilled in the art with the benefit of this disclosure will understand other alternatives that may also be used to vary the biasing force exerted against the centrifugal weight assemblies 26.

Figure 14:
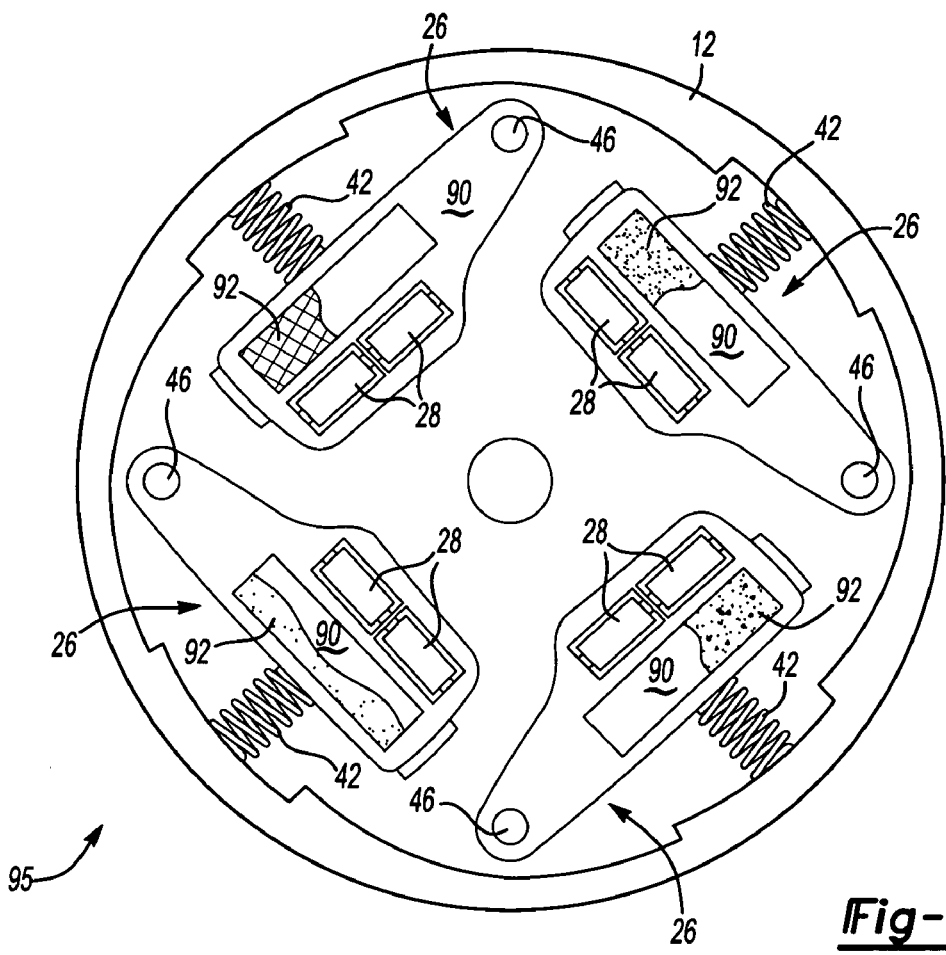
FIG. 14 is a schematic plan view of another clutch assembly according to this invention including a viscous medium.

Referring to FIG. 14, a centrifugal clutch assembly 95 according to this invention is shown and includes a chamber 90 filled with a viscous medium 92. In certain situations, centrifugal clutch assemblies may begin to chatter or shudder due to the individual weights vibrating or oscillating. Chatter or shudder can in some instances occur at or near engagement and disengagement rotational speeds due to the variation of the centrifugal forces caused by irregularity of the engine speed. The engine speed irregularity and variation of centrifugal force can cause small engage and disengage movements of the slipping clutch, leading to a oscillating clutch torque which can excite torsional oscillating of the drive train. The viscous medium 92 disposed within the centrifugal weight assemblies 26 of this embodiment dampens such oscillations Viscous medium 92 dampens oscillations and vibrations in the centrifugal weight assemblies 26 by absorbing and slowing direction changes of the centrifugal weight assembly 26. When the centrifugal weight assembly 26 changes direction there will be a delay built in to movement of the viscous material 92 disposed within the chambers 90. This delay counters vibration or oscillation forces and slows the reaction of the centrifugal weight assembly 26 such that the vibratory movement is dampened. Damping the oscillations of the centrifugal weights 26 results in improved operation of the clutch assembly as well as increased longevity and durability.

Figure 15:
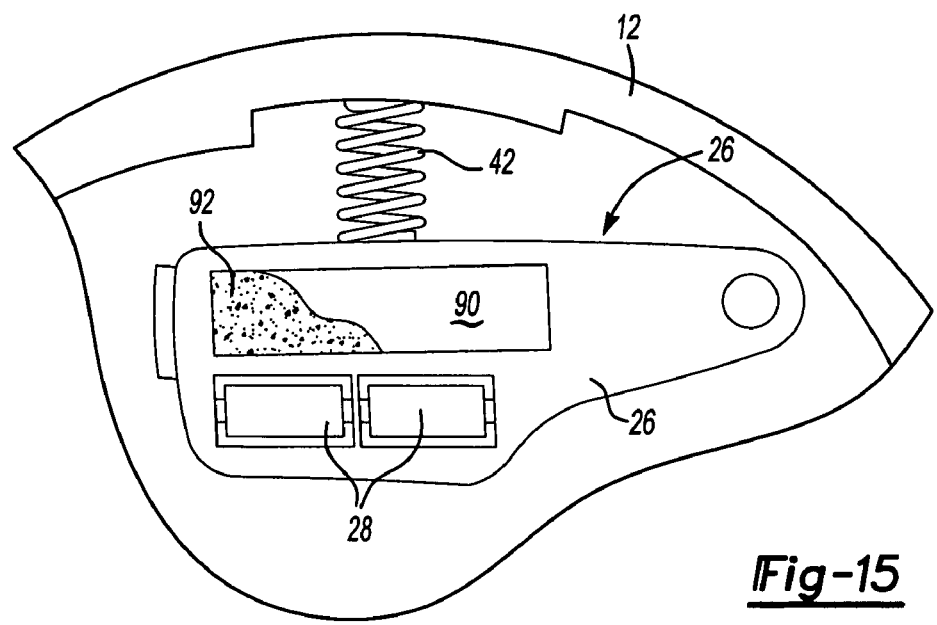
FIG. 15 is an enlarged schematic view of the clutch assembly shown in FIG. 14.

Referring to FIG. 15, an enlarged view of the centrifugal weight assembly 26 is shown. The biasing spring 42 biases the centrifugal weight assembly 26 toward the axis 16. Rotation of the clutch cover 12 results in pivoting movement on the centrifugal weight assembly 26 outward. This outward movement is balanced against the biasing forces exerted by the spring member 42. At certain rotational speeds of the clutch assembly 95 with a certain frequency or irregularity, the centrifugal forces generated by the centrifugal weight assembly 26 and the forces exerted by the spring members 42 will result in a harmonic frequency that causes oscillation of the centrifugal weight assembly 26. The viscous medium 92 within the chamber 90 operates to dampen these vibrations and oscillations by slowing reaction to changes in direction of the centrifugal weight assembly 26. The slowing of reaction time of the centrifugal weight assembly 26 improves the dampening characteristics and reduces oscillations.

A clutch assembly according to this invention provides for the modification of centrifugal clutch actuation during operation. Modification of clutch actuation enables tailoring of clutch engagement to changing operating conditions and to accommodate different vehicle characteristics.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A centrifugal clutch assembly comprising:

a plurality of friction plates and a corresponding plurality of pressure plates, said plurality of pressure plates movable between a clamped position engaging said plurality of friction plates and an open position released from said plurality of friction plates;

at least one weight movable radially in response to rotation to move said plurality of pressure plates between said clamped position and said open position, wherein said at least one weight swings about a pivot; and an adjuster for modifying a radial position of said at least one weight, wherein said adjuster comprises a threaded member received within said at least one weight such that rotation of said threaded member moves said at least one weight to change a distance between said at least one weight and said pivot.

2. The assembly as recited in claim 1, including a drive for moving said adjuster.

* * * * *

UNITED STATES PATENT AND TRADEMARK OFFICE
CERTIFICATE OF CORRECTION

PATENT NO. : 7,367,440 B2  Page 1 of 1
APPLICATION NO. : 11/049829
DATED : May 6, 2008
INVENTOR(S) : AbuSamra et al.

It is certified that error appears in the above-identified patent and that said Letters Patent is hereby corrected as shown below:

ON THE TITLE PAGE:
Item (75) Inventors:

Inventor Loren Christopher Dreier's information should read as: --Loren Christopher Dreier, Southern Pines, NC (US)--

Signed and Sealed this

Fifteenth Day of July, 2008

JON W. DUDAS
*Director of the United States Patent and Trademark Office*